(12) United States Patent
Yamada

(10) Patent No.: US 6,795,141 B2
(45) Date of Patent: Sep. 21, 2004

(54) LIQUID CRYSTAL DISPLAY DEVICE AND COLOR FILTER SUBSTRATE HAVING SPACERS FORMED DIRECTLY ON BLACK MATRIX

(75) Inventor: Tsutomu Yamada, Tainan (TW)

(73) Assignee: Chi Mei Optoelectronics, Tainan (TW)

( * ) Notice: Subject to any disclaimer, the term of this patent is extended or adjusted under 35 U.S.C. 154(b) by 101 days.

(21) Appl. No.: 10/036,357

(22) Filed: Jan. 7, 2002

(65) Prior Publication Data

US 2003/0128309 A1 Jul. 10, 2003

(51) Int. Cl.[7] ...................... G02F 1/1335; G02F 1/1333; G02F 1/1339
(52) U.S. Cl. ...................... 349/106; 349/110; 349/111; 349/155
(58) Field of Search ................................. 349/106, 110, 349/111, 155, 156, 123

(56) References Cited

U.S. PATENT DOCUMENTS

| | | | |
|---|---|---|---|
| 5,978,061 A | * | 11/1999 | Miyazaki et al. ........... 349/155 |
| 6,181,406 B1 | * | 1/2001 | Morimoto et al. .......... 349/155 |
| 6,266,122 B1 | * | 7/2001 | Kishimoto et al. ......... 349/156 |
| 2001/0026347 A1 | * | 10/2001 | Sawasaki et al. ........... 349/156 |
| 2002/0039166 A1 | * | 4/2002 | Song .......................... 349/156 |
| 2002/0075443 A1 | * | 6/2002 | Shimizu et al. ............. 349/155 |

* cited by examiner

Primary Examiner—Tarifur R. Chowdhury
(74) Attorney, Agent, or Firm—Lowe Hauptman; Gilman & Berner LLP

(57) ABSTRACT

A color filter substrate for an LCD device comprises a transparent substrate having a substantially flat surface, a black matrix, a plurality of color filters, an electrode, a plurality of spacers, and an alignment film. The black matrix is formed on predetermined regions of the substrate. The plurality of color filters are formed between the regions of the black matrix with overlapping portions on the edge. The electrode is formed over the black matrix and the color filters. The plurality of spacers are formed on the regions of the black matrix without overlapping with the color filters, and the alignment film for aligning the liquid crystal molecular is formed over the black matrix, the color filters, the electrode, and the spacers.

16 Claims, 6 Drawing Sheets

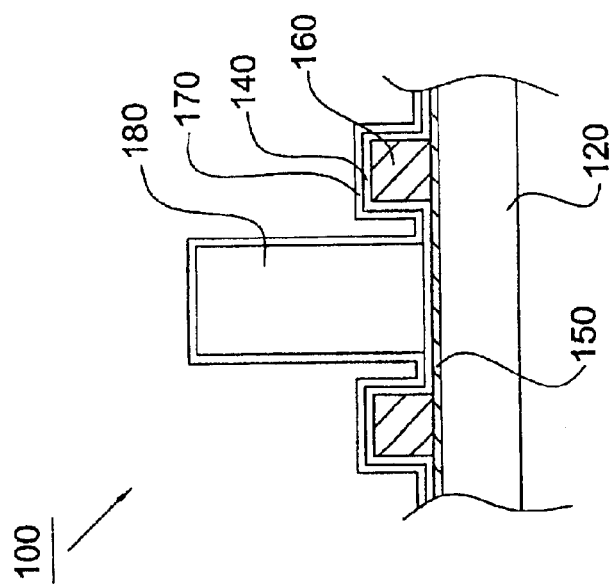
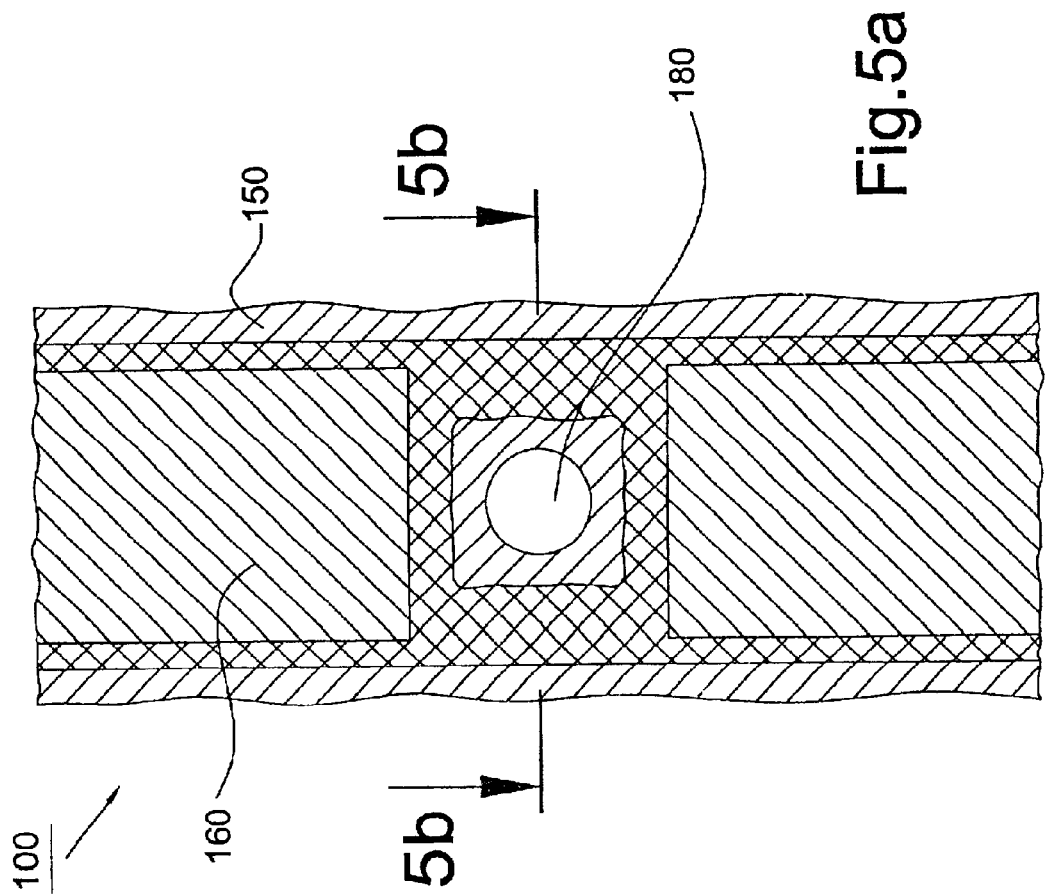

LIQUID CRYSTAL DISPLAY DEVICE AND COLOR FILTER SUBSTRATE HAVING SPACERS FORMED DIRECTLY ON BLACK MATRIX

BACKGROUND OF THE INVENTION

1. Field of the Invention

The present invention generally relates to a liquid crystal display device, and more particularly, to a liquid crystal display device having a structure in which the spacers maintain the uniform and precise cell gap to substantially reduce the Mura defect.

2. Description of the Related Art

A liquid crystal display device typically includes a pair of substrates which are maintained in a spaced apart, yet parallel relationship with one another. The space between the substrates is commonly referred to as the cell gap. Interposed between the substrates, within the cell gap, is a liquid crystal material which changes its optical characteristics in response to an applied electrical signal.

A plurality of electrodes are disposed upon the inner surface of the substrates in order to control and apply the desired electrical signals to the liquid crystal material. Some LCD devices will have an electrode arrangement which allows a predetermined set of characters or symbols to be generated, while other LCD devices have a matrix of electrodes that form a display comprised of a great plurality of individually accessible pixel elements, each of which may be selectively activated to form an infinite variety of images.

Due to the electro-optical characteristics inherent the liquid crystal material, it will typically assume one state when no electrical signal is applied and will assume another different state when an electrical signal is applied. For example, some liquid crystal materials will assume a reflective state when no electrical signal is applied, and will assume a transmissive state under the influence of an applied electrical signal. Some new liquid crystal materials provide performance with a variety of different gray levels as well.

In order to assure the proper operation of a liquid crystal display device, it is critical that the cell gap is maintained uniformly and precisely throughout the entire display. Even slight deviations in the cell gap will result in a noticeable and defective appearance in the display (so-called Mura defect). This can readily be seen with a conventional LCD display panel when even slight pressure is applied by a fingertip. In response to the pressure, the cell gap in the affected area will be reduced slightly, resulting a dark spot, degradation of contrast or other undesirable defect in the displayed image.

In a conventional technology, the LCD device, as shown in FIG. 1, includes a TFT substrate 61, a color filter substrate 71 and liquid crystal material sandwiched therebetween. The cell gap is maintained by providing a plurality of spacers 79 between the substrates 61 and 71. The spacers 79, which are of a uniform height, are disposed usually randomly within the cell gap, such as by a spraying technique. This generally results in an uneven distribution of spacers. To ensure that an adequate concentration of spacers to maintain the proper cell gap is disposed in all areas of the display, a superfluity of spacers must be used. In addition, according to such conventional techniques for placement of the spacers, they are placed in both "inactive" and "active" areas of the display. The "active" areas are those areas of the liquid crystal material which may be selectively activated because they are located between opposed electrodes disposed upon the substrates. The "inactive" areas are those areas of the liquid crystal material that cannot be selectively activated because of the absence of opposed electrodes on the substrates.

Inherently, there are several undesirable deficiencies in the structure and performance of the liquid crystal display panel existing in such conventional spacer techniques. Spacers which are disposed in the active display areas, particularly due to the superfluity of spacers, cause defects, such as the degradation of contrast or the undesirable emission of light around the edges of the spacers therein.

Therefore, European Patent 1030211 A2, incorporated herein by reference, discloses a liquid crystal display, shown in FIG. 2, which can omit the step of scattering spacers and thus avoiding deviations in cell thickness due to the uneven distribution of spacers. This LCD generally includes a TFT (Thin Film Transistor) substrate 30, a CF (Color Filter) substrate 40 and a liquid crystal material layer 49 sealed therebetween. As shown in FIG. 2, the projection patterns 45 formed on the CF substrate 40 have a height of about 4.0 $\mu$m to keep the uniform cell gap.

However, the spacer in the both liquid crystal displays of the conventional technology and the above mentioned European patent is deposited on the glass substrate and the color filter layer is disposed between the spacer and the substrate.

Now referring to FIG. 4, it depicts a stress-strain diagram of the post spacer of $20^{\Phi}$ $\mu$m deposited directly on a glass substrate at room temperature and with a color filter layer interposed between the post spacer and the glass substrate. It will be appreciated that the spacer deposited directly on the glass substrate is substantially elastic, shown as the curve A, but the spacer deposited on the glass substrate with the color filter layer interposed therebetween is partial elastic, shown as the curve B, in which a permanent strain remains after the load is released. Thus, if a pressure (or stress) loaded on the LCD is big enough to result in the permanent strain, the total height of the spacer with the color filter layer deposited on the glass substrate will be changed. In other words, the cell gap may be uneven and the Mura defect may be generated after the LCD panel is loaded with a substantial pressure.

European Patent 1030211 A2 further discloses another structure of the LCD, as shown in the FIG. 3, wherein a black matrix 52 is formed on the glass substrate 51 on the side of a color filter substrate 50 to coincide with a gate bus lines 33b, a drain bus lines 33a, TFTs and auxiliary capacitance electrodes on a TFT substrate 30. This black matrix 52 is formed of black resin to have a thickness of about 4 $\mu$m. The color filters 53 (red, green, and blue) are formed at opening portions of the black matrix 52 with a thickness of 1.5 $\mu$m. Then, an opposing electrode 54 formed of ITO (Indium-tin Oxide) is formed on the black matrix 52 and the color filters 53. A projection pattern 55 of about 1.5 $\mu$m height is formed on the opposing electrode 54 in a zigzag fashion. In the result, the black matrix 52 together with the projection pattern 55 forms a spacing structure for keeping the uniform cell gap with respect to the other substrate, thereby replacing the conventional spacer. However, the black matrix 52 formed of black resin still fails to prevent a permanent strain remaining after the load is released.

Accordingly, there exist needs for providing a liquid crystal display device having a structure in which the spacers maintain the uniform and precise cell gap to substantially reduce the Mura defect.

SUMMARY OF THE INVENTION

It is a primary object of the present invention to provide a liquid crystal display device having a structure in which the spacers maintain the uniform and precise cell gap of the LCD device even though the LCD device is loaded with a pressure or a force.

It is another object of the present invention to provide a liquid crystal display device having a structure in which the spacers maintain the uniform and precise cell gap of the LCD device, thereby substantially reducing the Mura defect.

In order to achieve the objects mentioned hereinabove, the present invention provides a color filter substrate for an LCD device. The color filter substrate comprises a transparent substrate having a substantially flat surface, a black matrix, a plurality of color filters, an electrode, a plurality of spacers, and an alignment film. The black matrix is formed on predetermined regions of the substrate. The plurality of color filters are formed between the regions of the black matrix with overlapping portions on the edge. The electrode is formed over the black matrix and the color filters. The plurality of spacers are formed on the regions of the black matrix without overlapping with color filters, and the alignment film for aligning the liquid crystal molecular is formed over the regions of the black matrix, the color filters, the electrode, and the spacers.

The present invention further provides a method for manufacturing a color filter substrate for an LCD device comprising the steps of: providing a transparent substrate having a substantially flat surface; forming a black matrix on predetermined regions of the substrate; forming a plurality of color filters between the regions of the black matrix with overlapping portions on the edge; forming an electrode over the black matrix and the color filters; forming a plurality of spacers on the regions of the black matrix without overlapping with color filters; and applying an alignment film for aligning the liquid crystal molecular over the regions of the black matrix, the color filters, the electrode, and the spacers.

Accordingly, the spacers according to the present invention are directly deposited on the glass substrate so the LCD device can resile well and the cell gap can be kept uniform after enduring a pressure or a force, thereby substantially reducing the Mura defect. In addition, since the spacers according to the present invention can be correctly positioned on the black matrix, the image displayed on the LCD device is not affected by the spacers.

BRIEF DESCRIPTION OF THE DRAWINGS

Other objects, advantages, and novel features of the invention will become more apparent from the following detailed description when taken in conjunction with the accompanying drawings.

FIG. 5a is a plan view of a color filter substrate of an LCD device according to the present invention.

FIG. 5b is a cross sectional view of the color filter substance along the line 5b—5b of the FIG. 5a.

DESCRIPTION OF THE PREFERRED EMBODIMENT

Figure 1:
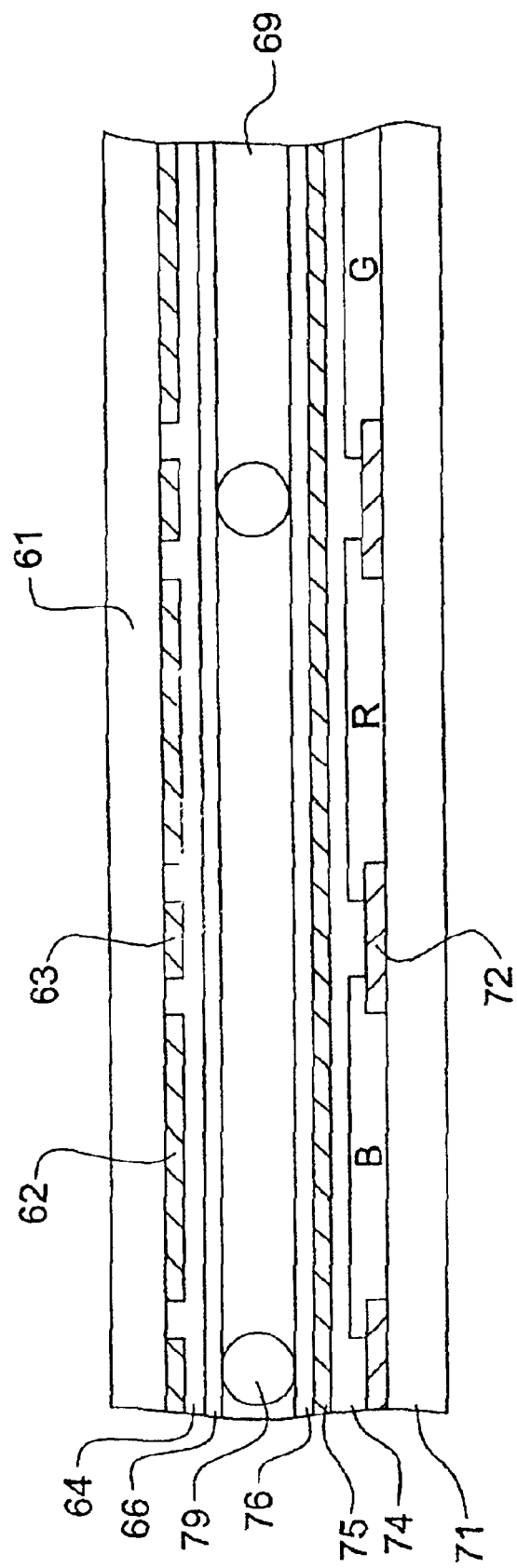
FIG. 1 is a cross sectional view of a conventional LCD device with ball spacers.
Figure 2:
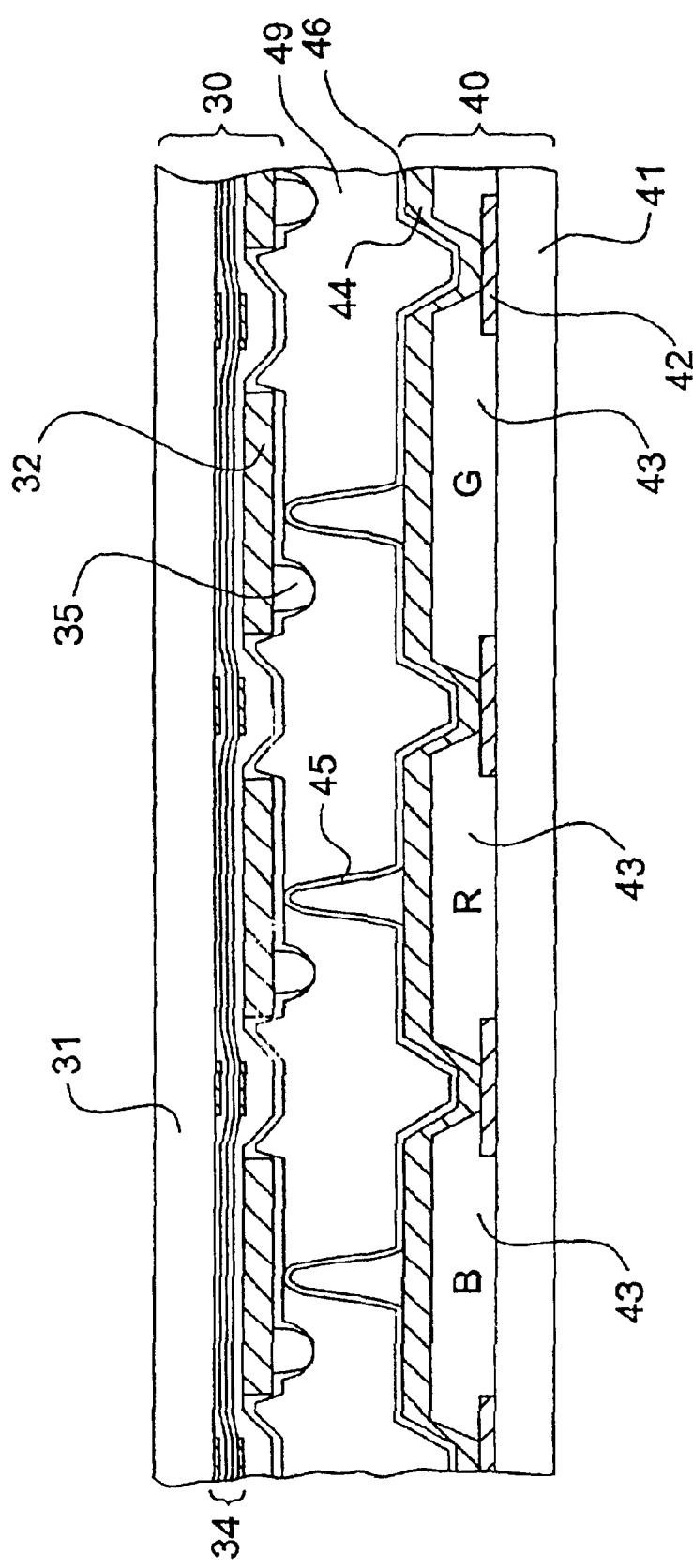
FIG. 2 is a cross sectional view of a conventional LCD device with projection pattern spacers.
Figure 3:
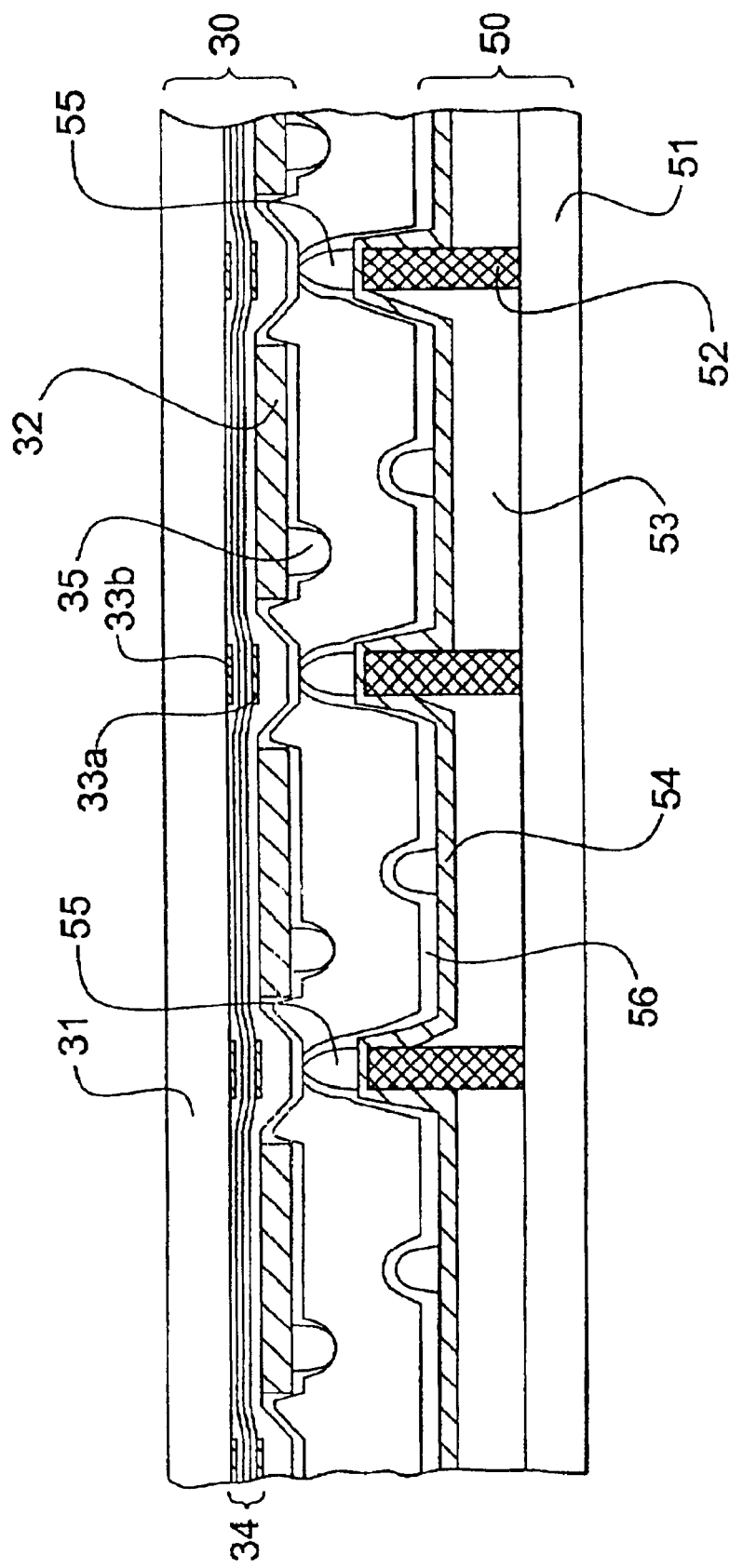
FIG. 3 is a cross sectional view of a conventional LCD device with black matrix spacers.

The present invention will now be described more fully hereinafter with the color filter substrate of the thin film transistor liquid crystal display (TFT LCD) device by way of an example, but it should be noted that the spirit and the scope of the present invention will not be limited thereto. Now referring to FIGS. 5a and 5b, they depict a CF (Color Filter) substrate 100 of a thin film transistor liquid crystal display according to the present invention.

As shown in FIG. 5a, it depicts about the length and the width of one pixel (two half pixels) formed on the CF substrate 100 as a single unit, which is opposite to the thin film transistor on the TFT substrate (not shown) of the LCD device. Now further referring to FIG. 5b, it is a cross sectional view of the CF substance 100 along the line 5b–5b of the FIG. 5a, in which the CF substrate 100 generally has a transparent substrate 120, e.g. a glass substrate 120 having a substantially flat surface, a black matrix 150, color filters 160, and a spacer 180 deposited on the glass substrate 120.

The black matrix 150 generally is made of metal such as chromium (Cr) or chromium oxide (CrOx) in the form of a thin film and is applied on the portion of the glass substrate 120 corresponding to the inactive portion of the LCD device, which includes drain bus lines, gate bus lines, auxiliary capacitance electrodes and TFTs on the TFT substrate. The color filters 160 consisting of red, green and blue color filters are formed on the glass substrate 120 corresponding to the active portion of the LCD device, which is opposite to the pixel electrodes on the TFT substrate.

In the preferable embodiment, the black matrix 150, the color filters 160, the electrode layer 140 and the spacers 180 have a thickness of about 0.16 $\mu$m, about 1.5 $\mu$m, about 0.15 $\mu$m, and about 4 $\mu$m, respectively.

It should be understood by those skilled in the art that an alignment film 170 formed of polyimide can be further applied over the glass substrate 120 to have a thickness of about 0.1 $\mu$m. The surface of the alignment film 170 is subjected to the rubbing process for aligning the liquid crystal molecule.

Furthermore, when the CF substrate 100 according to the present invention is applied to an LCD of vertically-aligned (VA) type, the CF substrate 100 can be provided with a domain regulating means for regulating the orientation of a liquid crystal, such as protrusions formed on the CF substrate 100. The VA LCD with domain regulating means is disclosed in the European Patent Publication Number 0884626-A2 incorporated herein by reference.

Figure 6:
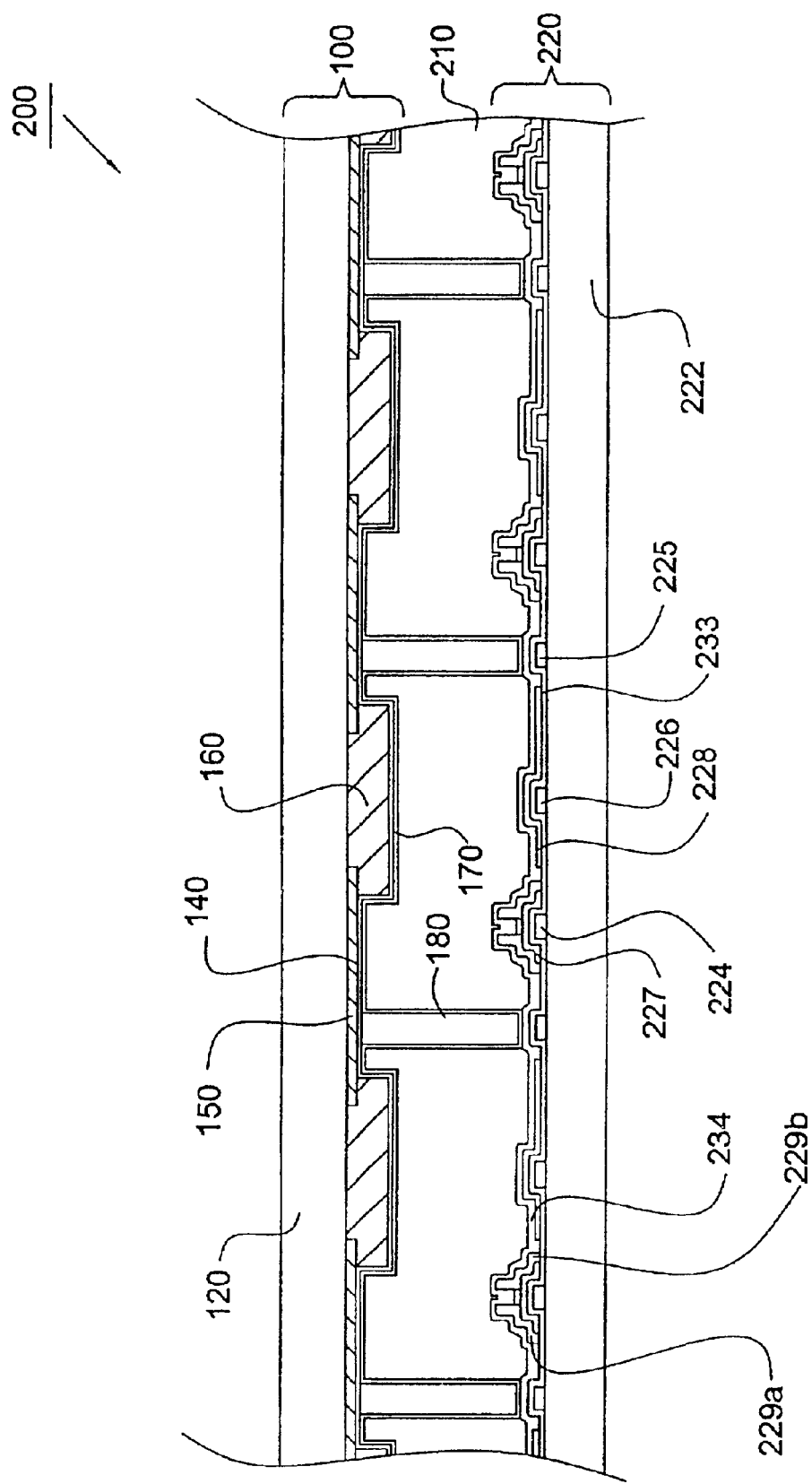
FIG. 6 is a partial cross sectional view of a LCD device according to the present invention.

Now referring to FIG. 6, it depicts a LCD device 200 according to the present invention. The LCD device 200 includes the CF substrate 100 and a TFT substrate 220 according to the present invention, and the edge portions of the CF substrate 100 and the TFT substrate 220 are adhered together to define a cavity for receiving the liquid crystal material 210. The cavity has a uniform and precise gap (cell gap) defined by means of the plurality of spacers 180. The TFT substrate 220 is of a structure as described below. On a glass substrate 222, gates 224, gate lines (scanning lines) 225 and storage capacitance lines 226 are respectively formed. The gates 224, the gate lines 225 and the storage capacitance lines 226 are covered by an insulating film 233. A semiconductor layer 227 serving as channel of TFT (Thin Film Transistor) is formed on each gate 224 through the insulating film 233. Moreover, metal layers 229a, 229b serving as source and drain regions of the TFT are formed on the upper portion of each semiconductor layer 227 and connected to source lines and pixel electrodes 228. Further, the pixel electrode 228 comprising, e.g., ITO is formed to cover each storage capacitance line 226 through the insulating film 233. In addition, an alignment film 234 is formed on the source and drain regions 229a, 229b and the pixel electrode 228.

This present invention further provides a method for manufacturing the CF substrate 100 and the LCD device, which comprises a plurality of spacers 180 directly deposited on the CF substrate 100. First, the glass substrate 120 with a flat surface is provided. A chromium film of about 0.16 μm thickness is formed on the glass substrate 120, then a photoresist having a predetermined pattern is formed on the chromium film, and then the black matrix 150 is formed by etching the chromium film while using the photoresist as a mask.

The color filters 160 of red, green, and blue are formed by coating blue resin, red resin, and green resin on the glass substrate 120, respectively. The thickness of the color filters 160 is set about 1.5 μm. The color filters 160 are overlapping with the black matrix 150 on the edge. The color filters 160 are formed as a pattern that exposes the underlying black matrix 150.

Then, the electrode layer 140 of about 0.15 μthickness is formed by sputtering ITO, for example, on the surface of the glass substrate 120. Then, photoresist of about 4 μm thickness is coated on the electrode layer 140, and the plurality of spacers 180 each having a thickness of about 4 μm and being in the shape of a general cylinder, are formed by exposing and developing the photoresist. Finally, the alignment film is formed to cover the surface of the glass substrate 120.

Furthermore, the CF substrate 100 is combined with a TFT substrate and the edge portions of the CF substrate 100 and TFT substrate are adhered together to define a cavity for receiving the liquid crystal material. The cavity has a uniform and precise gap (cell gap) defined by means of the plurality of spacers 180. The cavity is filled with the liquid crystal material and then sealed. Then, the LCD device according the present invention is completed after attaching polarizers to the CF substrate 100 and the TFT substrate, respectively.

Figure 4:
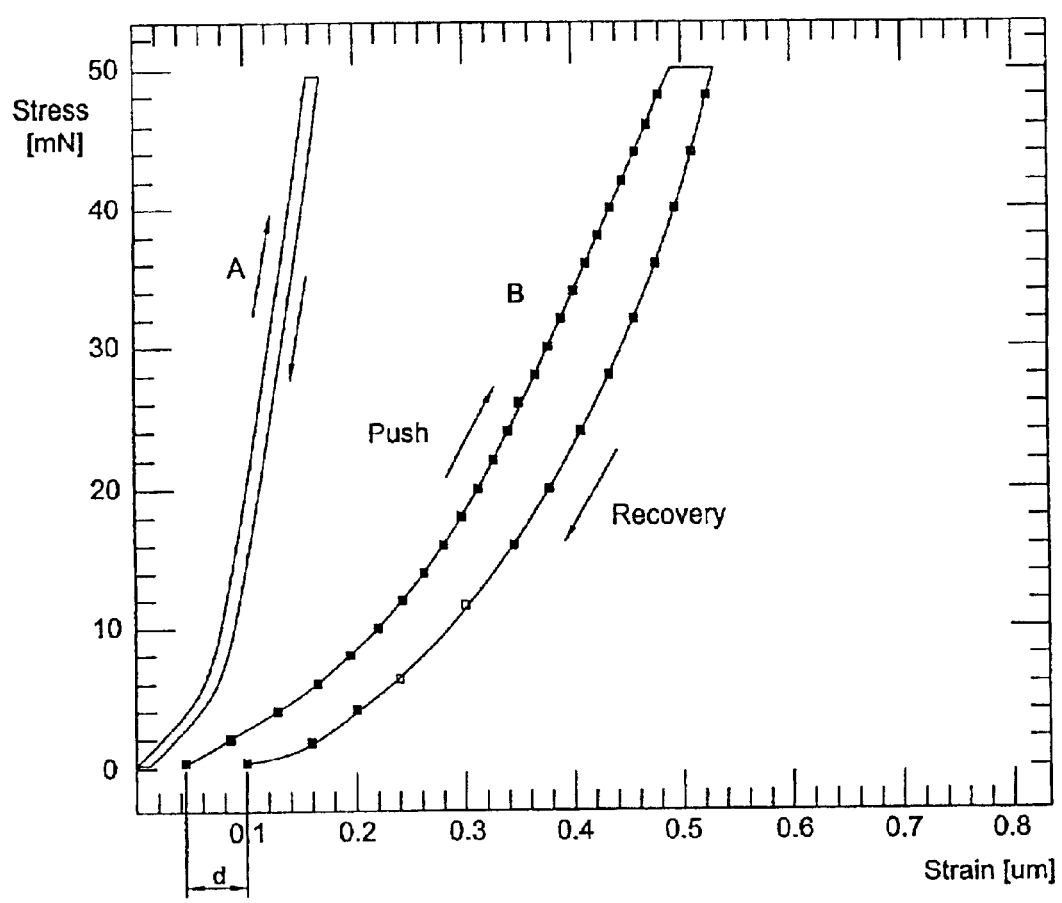
FIG. 4 is a stress-strain schematic diagram of the spacer deposited directly on a glass substrate and with a color filter layer interposed between the spacer and the glass substrate.

As mentioned above, the spacers 180 according to the present invention are directly deposited on the lass substrate, which is substantially elastic as shown by curve A in FIG. 4. When the LCD device is loaded with an external pressure or a force, only the spacers 180 are deformed. Since the spacers 180 directly deposited on the glass substrate according to the present invention are substantially elastic, after the external pressure or load is released, the spacers 180 will return to their original dimensions to maintain the uniform and precise cell gap without incurring Mura defect.

In addition, since the spacers 180 according to the present invention can be correctly positioned on the black matrix, the image displayed on the LCD device is not affected by the spacers.

Although the invention has been explained in relation to its preferred embodiment, it is to be understood that many other possible modifications and variations can be made without departing from the spirit and scope of the invention as hereinafter claimed.

What is claimed is:

1. A color filter substrate for a liquid crystal display device, said color filter substrate comprising:
   a transparent substrate having a substantially flat surface;
   a black matrix formed on predetermined regions of the substrate;
   a plurality of color filters formed between the regions of the black matrix, and overlapping edge portions of the regions of the black matrix;
   an electrode layer formed over the black matrix and the color filters;
   a plurality of spacers formed on the electrode layer in the regions of the black matrix without overlapping the color filters; and
   an alignment film for aligning liquid crystal molecules, said alignment film being formed over the regions of the black matrix, the color filters, the electrode layer, and the spacers;
   wherein said electrode layer is in direct contact with the black matrix.

2. A color filter substrate as claimed in claim 1, wherein the plurality spacers are in the shape of a cylinder.

3. A color filter substrate as claimed in claim 1, wherein the black matrix is made of a metal film.

4. The color filter substrate of claim 1, wherein said black matrix has a substantially uniform thickness.

5. The color filter substrate of claim 1, wherein said black matrix includes a metal film having a thickness smaller than a height of said spacers as measured in a direction normal to the substantially flat surface.

6. A method of manufacturing a color filter substrate for a liquid crystal display device, said method comprising the steps of:
   providing a transparent substrate having a substantially flat surface;
   forming a black matrix on predetermined regions of the substrate;
   forming a plurality of color filters between the regions of the black matrix, the color filters overlapping edge portions of the regions of the black matrix;
   forming an electrode over the black matrix and the color filters;
   forming a plurality of spacers on the electrode in the regions of the black matrix without overlapping the color filters; and
   applying an alignment film for aligning liquid crystal molecules over the regions of the black matrix, the color filters, the electrode, and the spacers;
   wherein said electrode is formed to be in direct contact with the black matrix.

7. A method as claimed in claim 6, wherein the spacers are formed by the steps of:
   applying a photoresist having a predetermined thickness over the black matrix, the color filters, and the electrode; and
   exposing and developing the photoresist to position the spacers on the regions of the black matrix where there are no said color filters.

8. The method of claim 6, wherein said black matrix is formed to have a substantially uniform thickness.

9. A liquid crystal display device, comprising:
   a thin film transistor substrate comprising thin film transistors, gate and source lines and a first alignment film;
   a color filter substrate comprising:
      a transparent substrate having a substantially flat surface;
      a black matrix formed on predetermined regions of the substrate;
      a plurality of color filters formed between the regions of the black matrix, and overlapping edge portions of the regions of the black matrix;
      an electrode formed over the black matrix and the color filters;
      a plurality of spacers formed on the electrode in the regions of the black matrix without overlapping the color filters; and a second alignment film for aligning liquid crystal molecules, said second alignment film being formed over the regions of the black matrix, the color filters, the electrode, and the spacers, and a liquid crystal material sandwiched between the color filter substrate and the thin film transistor substrate;

wherein said electrode is in direct contact with the black matrix.

10. A liquid crystal display device as claimed in claim 9, wherein the plurality spacers are in the shape of a cylinder.

11. A liquid crystal display device as claimed in claim 9, wherein the black matrix is made of a metal film.

12. The liquid crystal display device of claim 9, wherein said black matrix has a substantially uniform thickness.

13. The liquid crystal display device of claim 9, said black matrix includes a metal film having a thickness smaller than a height of said spacers as measured in a direction normal to the substantially flat surface.

14. A method of manufacturing a liquid crystal display device, said method comprising the steps of:

providing a thin film transistor substrate having thin film transistors, storage capacitance, gate and source lines and a first alignment film;

providing a color filter substrate having a substantially flat surface;

forming a black matrix on predetermined regions of the color filter substrate;

forming a plurality of color filters between the regions of the black matrix, the color filters overlapping edge portions of the regions of the black matrix;

forming an electrode over the black matrix and the color filters;

forming a plurality of spacers on the electrode in the regions of the black matrix without overlapping the color filters; and applying a second alignment film for aligning liquid crystal molecules over the regions of the black matrix, the color filters, the electrode, and the spacers;

adhering the thin film transistor substrate to the color filter substrate to form a cavity; and filling the cavity with a liquid crystal material;

wherein said electrode is formed to be in direct contact with the black matrix.

15. A method as claimed in claim 14, wherein the spacers are formed by the steps of:

applying a photoresist having a predetermined thickness over the black matrix, the color filters, and the electrode; and exposing and developing the photoresist to position the spacers on the regions of the black matrix where there are no said color filters.

16. The method of claim 14, wherein said black matrix is formed to have a substantially uniform thickness.

* * * * *